United States Patent Office 3,362,217
Patented Jan. 9, 1968

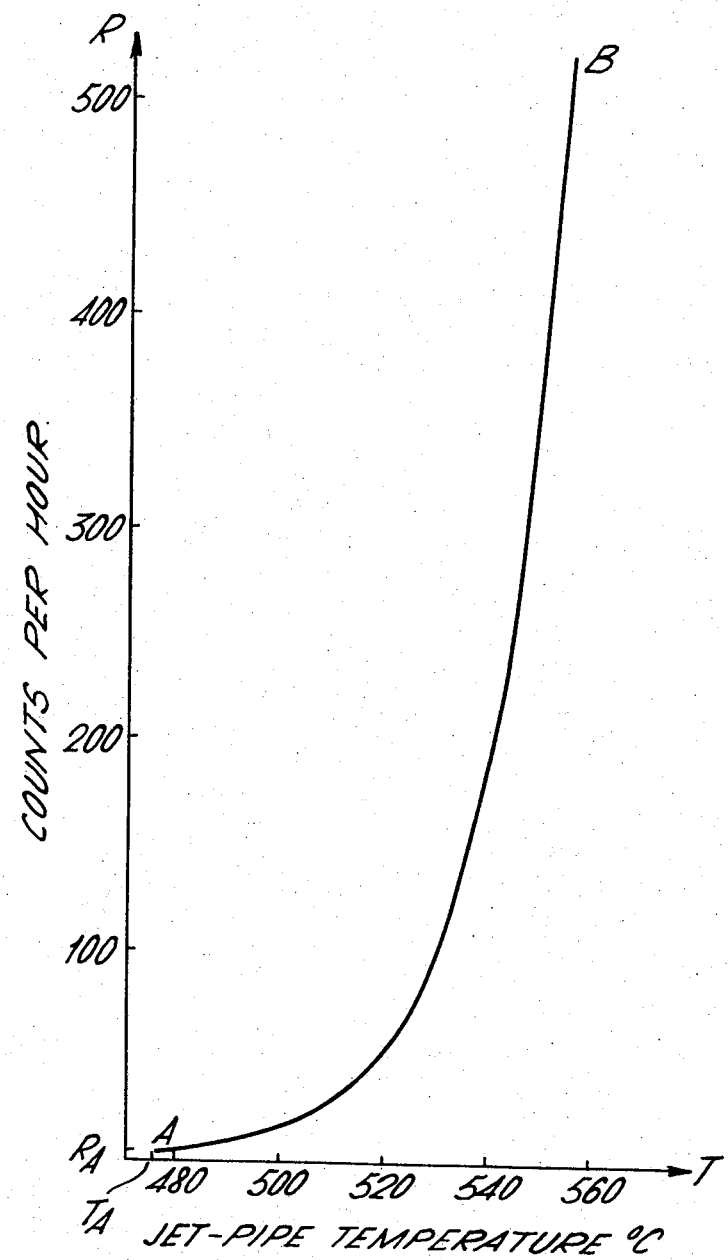

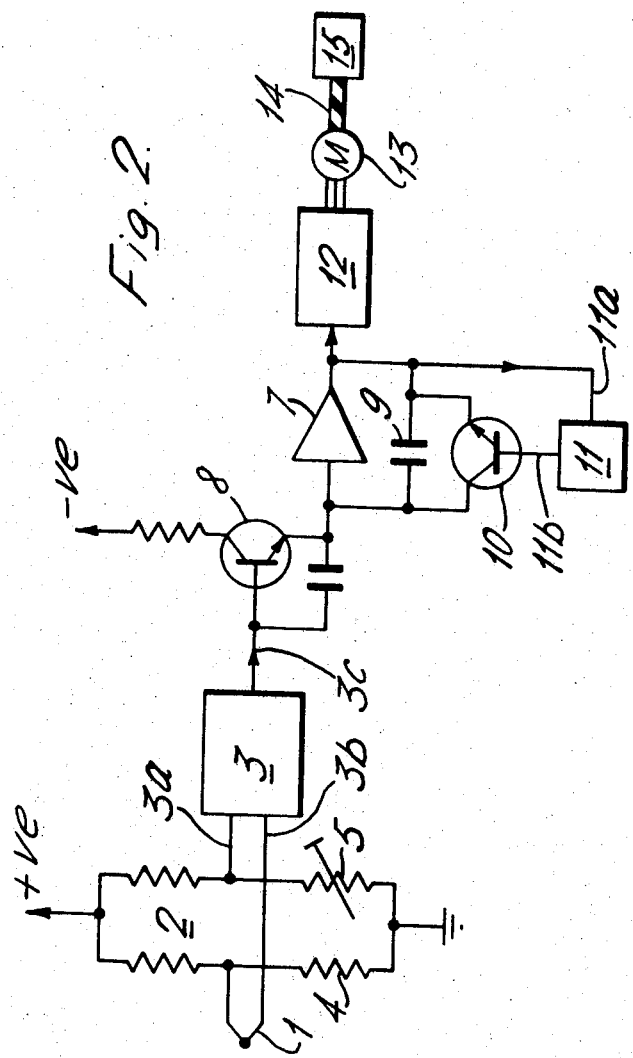

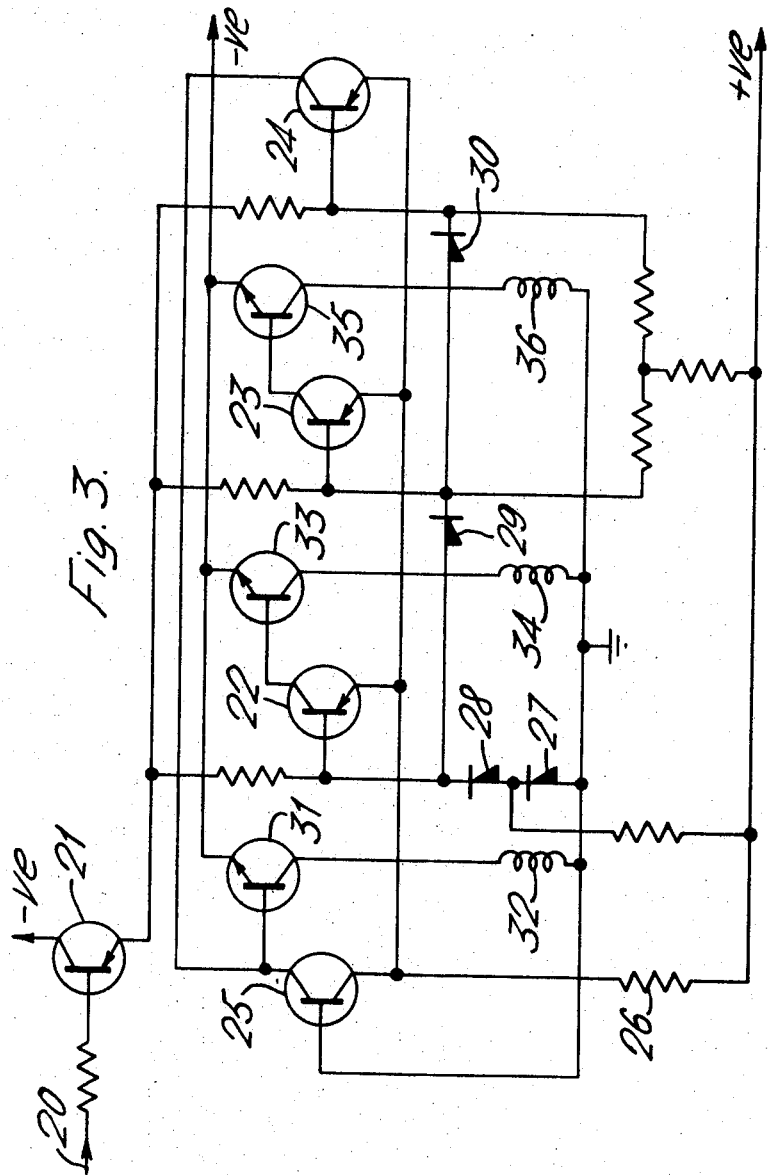

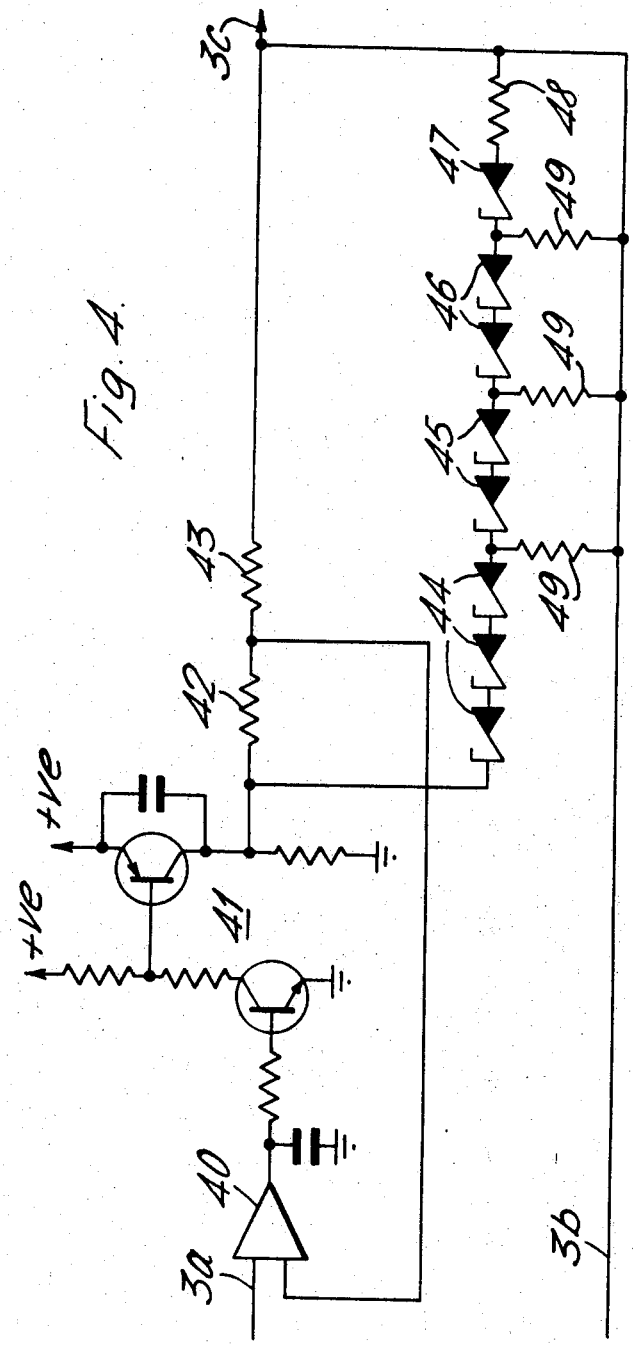

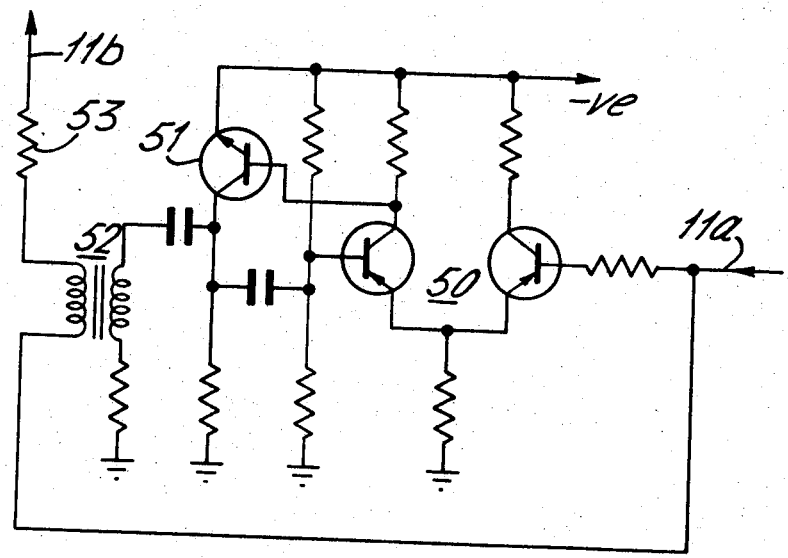

3,362,217
ELECTRICAL APPARATUS FOR PROVIDING A REPRESENTATION OF ENGINE-LIFE
John Fawcett Ogilvie Evans, Micheldever, and Derek Anthony Rush, Kingsclere, England, assignors to S. Smith & Sons (England) Limited, London, England, a British company
Filed Apr. 23, 1965, Ser. No. 450,454
Claims priority, application Great Britain, Apr. 24, 1964, 17,217/64
8 Claims. (Cl. 73—116)

ABSTRACT OF THE DISCLOSURE

Representation of the expended life of a gas-turbine engine is made in accordance with both running-time and jet-pipe temperature by counting cycles of a sawtooth waveform that has a frequency dependent upon the sensed temperature. The waveform is generated by terminating and then restarting integration with respect to time of a signal that is dependent upon the sensed temperature, each time the integral reaches a limit. Different stator windings of an electric motor are energized in turn through each sawtooth-cycle in order to drive a mechanical counter in accordance with the number of cycles.

---

This invention relates to electrical apparatus for providing a representation of engine-life.

In order that an engine shall give efficient and trouble-free service, it is the practice to specify that maintenance procedures shall be carried out at regular intervals. These intervals are commonly expressed in terms of permissible running-time of the engine and are determined in relation to the demand which in any particular case is imposed on the engine. If in any case the demand imposed can be predicted as being substantially constant, or not varying beyond a nominally-normal level, the intervals can be straight-forward expressions of running-time, the expended part of any interval being given by the sum of the periods for which the engine has operated since the start of the interval. This sum gives a satisfactory representation of what is herein referred to as engine-life, the imposed demand in these circumstances being for practical purposes constant, so that its effect on the engine is represented satisfactorily solely by the time for which it is applied.

Where there is substantial and unpredictable variation in the imposed demand the effect on the engine cannot be related simply to the running-time, and account has to be taken of the extent and duration of the variation, in assessing engine-life. Some measure of the extent to which the imposed demand varies beyond a normal operational level can be obtained by reference to the consequent variation in one or more operational parameters of the engine, and a representation of engine-life can thereby be provided by monitoring variation with time of the relevant parameter or parameters throughout operation.

According to the present invention electrical apparatus for providing a representation of engine-life as dependent upon at least one operational parameter of the engine, comprises first means for providing a signal dependent upon the value of said one parameter, second means which is for providing a cyclically-recurring signal and which is arranged to be responsive to the signal provided by said first means to provide said cyclically-recurring signal at a frequency dependent upon the value of said one parameter, and third means for providing a representation of engine-life in accordance with the number of cycles of said cyclically-recurring signal provided by said second means during the relevant period of operation of the engine.

The said one predetermined parameter may be temperature of a particular part of the engine, and in this case said first means may include a thermocouple arranged to provide a signal dependent upon this temperature.

According to a feature of the present invention, electrical apparatus for providing a representation of engine-life as dependent upon at least one operational parameter of the engine, comprises first means for providing a first electric signal dependent in magnitude upon the value of said one parameter, second means for integrating with respect to time said first electric signal and arranged such that the integration process is terminated and restarted whenever the integral reaches a predetermined value so as to derive a cyclically-recurring electric signal of substantially sawtooth waveform having a frequency dependent upon the magnitude of said first signal, and third means for providing a representation of engine-life in accordance with the number of cycles of said second signal during the relevant period of operation of the engine.

The said third means may include an electric motor that is controlled to produce one revolution of the motor-shaft for each cycle of the signal provided by said second means, the representation of engine-life being provided as a count of the number of revolutions.

Electrical apparatus, which is in accordance with the present invention and which is for use in providing a representation of engine-life of an aircraft gas-turbine engine, will now be described, by way of example, with reference to the accompanying drawings in which:

FIGURE 1 shows a characteristic based on operational data of the gas-turbine engine, this characteristic serving to relate rate of change of engine-life to a monitored operational parameter of the engine;

FIGURE 2 is a diagrammatic representation, partly in schematic form, of the electrical apparatus;

FIGURE 3 is a circuit diagram of an electric-motor control-circuit used in the apparatus of FIGURE 2;

FIGURE 4 is a circuit diagram of a non-linear circuit used in the apparatus of FIGURE 2; and FIGURE 5 is a circuit diagram of a discharge-control circuit used in the apparatus of FIGURE 2.

The electrical apparatus to be described monitors jet-pipe temperature T of the gas-turbine engine and provides a representation of the expended life in accordance with both the monitored temperature and running-time. With this particular engine, which is of a well-known type, there is a definite non-linear relationship between the permissible running-time of the engine and the temperature T' mid-way along the turbine blades in a second stage of the high-pressure turbine of the engine, and from data provided by the engine manufacturer it can be shown that this relationship remains substantially the same irrespective of variations in other engine parameters, for example speed. Thus it is possible to relate the engine-life solely to the temperature T' and this is done in the present case by specifying that the engine has $10^4$ units of permissible engine-life, and arranging that the rate at which these units are used up is varied in accordance with the temperature T'. The units of engine-life are expressed as "counts" and the rate R of their use is specified in terms of counts per hour. The following table shows the permissible life-hours and the corresponding counts per hour that are applicable at various operational values of the temperature T'.

| T', degrees centigrade | Permissible life-hours | R, counts/hour |
| --- | --- | --- |
| 797 | $10^4$ | 1 |
| 820 | $5\times10^3$ | 2 |
| 853 | $2\times10^3$ | 5 |
| 868 | $10^3$ | 10 |
| 884 | $5\times10^2$ | 20 |
| 902 | $2\times10^2$ | 50 |
| 917 | $10^2$ | 100 |
| 930 | 50 | 200 |
| 949 | 20 | 500 |
| 965 | 10 | 1,000 |

The jet-pipe temperature T of the engine is related in a known manner to the temperature T', and for convenience it is the jet-pipe temperature T that is monitored and used to derive the appropriate count-rate R during operation. The characteristic relating the count-rate R to the jet-pipe temperature T over the lower part of the operational range of the engine is shown in FIGURE 1.

Referring to FIGURE 1, the relationship between count-rate R and temperature T for jet-pipe temperatures exceeding a predetermined datum temperature $T_A$, is approximately logarithmic as represented by the curve AB. At the temperature $T_A$ a minimum datum count-rate $R_A$ applies.

The apparatus to be described provides a representation of the total "counts" expended, that is, a representation of engine-life, the rate at which this total is increased while the engine is running being dependent upon the extent to which the jet-pipe temperature T exceeds the datum value $T_A$. The minimum rate of increase is the datum rate $R_A$, the rate increasing approximately logarithmically, and substantially according to the curve AB, with temperatures in excess of the datum temperature $T_A$.

The construction of the apparatus will now be described with reference to FIGURE 2.

Referring to FIGURE 2, a thermocouple 1 is mounted in the engine to sense the jet-pipe temperature T and to supply a voltage signal dependent thereon via a resistance bridge network 2 to a non-linear circuit 3, the network 2 being connected, across one of its pair of opposite corners, in series with the thermocouple 1 to input leads 3a and 3b of the circuit 3. The network 2, which has stabilized direct current supplied across its other pair of opposite corners, performs two functions, a first of these being correction of error that arises in the signal supplied by the thermocouple 1 as a result of the fact that the temperature of the effective cold-junction of the thermocouple 1 is not maintained constant. The signal as corrected provides a true measure of jet-pipe temperature T, the correction being achieved by means of a temperature-sensitive resistor 4 that forms one arm of the bridge network 2 and is clocely associated thermally with the effective cold-junction (terminals to which the hot-junction wires are attached). The temperature-resistance characteristic of the resistor 4 is such that variation in cold-junction temperature from a predetermined value produces a shift in the balance-point of the bridge network 2, this shift being of the appropriate sense and extent to correct for the consequent error in thermocouple voltage.

The second function of the bridge network 2 is to relate the corrected-signal to a reference voltage level so that the signal applied to the circuit 3 is of one sense or the other according to whether the signal is larger or smaller than the reference. The reference voltage level is set by adjustment of a pre-set resistor 5 in the bridge network 2, the effect being that the signal applied to the circuit 3 is representative in magnitude and sense of the extent to which the jet-pipe temperature T differs from a datum corresponding to the setting of the resistor 5. The resistor 5 is set to provide the temperature $T_A$ as the datum, and the circuit 3 is responsive only to signals representative of jet-pipe temperatures in excess of this.

The non-linear characteristic of the circuit 3 is such that the output signal appearing on the output lead 3c of the circuit 3 is related to the input signal by a law corresponding to that represented by the curve AB of FIGURE 1. The signal on the lead 3c is accordingly representative of a count-rate corresponding to the temperature difference $(T-T_A)$, and specifically, has a current mangitude representative of the extent $(R-R_A)$, to which the appropraite count-rate R exceeds the datum rate $R_A$. This signal is applied to an amplifier 7 via a transistor stage 8 that serves to add in the signal a bias current corresponding to the datum count-rate $R_A$. The amplifier 7, as a result, receives a current signal representative in magnitude of the count-rate R appropriate to the sensed iet-pipe temperature T.

A capacitor 9 is connected between the output and input of the amplifier 7, the amplifier 7 and capacitor 9 thereby providing an integrator stage for integrating the received count signal with respect to time. The emitter-collector current path of a transistor 10 is connected across the capacitor 9 for effecting periodic discharge of the capacitor 9, conduction of the transistor 10 to discharge the capacitor 9 being controlled by a discharge-control circuit 11. The circuit 11 receives via a lead 11a the output signal of the amplifier 7, and emits a pulse whenever during the integration process the signal on the lead 11a reaches a predetermined negative potential level with respect to ground. This pulse is applied via a lead 11b to the base electrode of the normally non-conductive transistor 10 so as to cause the transistor 10 to conduct for the duration of the pulse.

Until the predetermined negative potential level is reached, the output signal of the amplifier 7 decreases linearly with time from ground potential at a rate dependent upon the magnitude of the signal received from the transistor stage 8, that is to say, at a rate dependent upon the count-rate R. When the predetermined negative voltage level is reached the pulse which is emitted on the lead 11b from the circuit 11 causes the capacitor 9 to be discharged via the emitter-collector current path of the transistor 10. The output signal of the amplifier 7 consequently returns to ground potential and the integration process recommences, the sequence of events recurring to provide the output signal with a negative-going sawtooth waveform having a frequency corresponding to the count-rate R.

The sawtooth waveform is supplied from the amplifier 7 to a motor control circuit 12. The circuit 12 controls energization of the stator windings of a three-phase electric motor 13 such that there is one revolution of the motor shaft 14 for each cycle of the sawtooth waveform. The motor shaft 14 drives a cyclometer counter 15 which provides a reading in decimal form of the number of revolutions of the shaft 14. The counter 15 accordingly provides a representation of the engine-life, the reading representing the integral with respect to time of the count-rate R.

The construction of the motor control circuit 12, of the non-linear circuit 3, and of the discharge-control circuit 11, will now be described in detail, with reference to FIGURES 3, 4, and 5 respectively.

Referring to FIGURE 3, the sawtooth waveform from the output of the amplifier 7 is applied in the motor control circuit 12 via a lead 20 to the base electrode of a P-N-P junction transistor 21. The transistor 21 is connected in an emitter-follower circuit configuration and has the base electrodes of three P-N-P junction transistors 22 to 24 connected to its emitter circuit. The transistors 22 to 24 are connected in a long-tailed circuit relationship with a further P-N-P junction transistor 25, the common emitter-load of the four transistors 22 to 25 being provided by a resistor 26. The base electrode of the transistor 25 is connected directly to ground so that the transistor 25 is biased to be normally conductive.

The base electrode of the transistor 22 is connected to ground through two series-connected diodes 27 and 28 that are biased to remain non-conductive until the potential of the base electrode of the transistor 22 reaches a first negative value, —V volts, with respect to ground. The base electrode of the transistor 23 is connected to the base electrode of the transistor 22 through a third diode 29, and the base electrode of the transistor 24 is connected to the base electrode of the transistor 23 through a fourth diode 30, the diodes 29 and 30 being biased to remain non-conductive until the potentials of the base electrodes of the transistors 23 and 24 are respectively —2V and —3V volts with respect to ground.

The value of V is chosen to be substantially one third part of the amplitude of the sawtooth waveform appearing at the emitter electrode of the transistor 21. Thus, each cycle of the sawtooth waveform can be divided into three substantially equal periods, a first during which the potential at the emitter electrode of the transistor 21 decreases from zero to —V volts with respect to ground, a second period during which it decreases from —V volts to —2V volts with respect to ground, and a third and last period during which it decreases from —2V to —3V volts with respect to ground, the third period being followed, in the first period of the next cycle, by a rapid flyback to zero potential.

When during the first period of each cycle the potential of the emitter electrode of the transistor 21 is more positive with respect to ground than —V volts, the transistors 22 to 24 are all non-conductive and the transistor 25 conductive. The collector electrode of the transistor 25 is connected to the base electrode of an N-P-N junction transistor 31 so that the transistor 31 conducts when the transistor 25 conducts. Conduction of the transistor 31 effects energization of a first stator-phase winding 32 of the motor 13 (FIGURE 2).

When the potential of the emitter electrode of the transistor 21 reaches —V volts with respect to ground at the end of the first period of each cycle, the diodes 27 and 28 become conductive and thus render the transistor 22 conductive also. Conduction of the transistor 22 causes an N-P-N junction transistor 33, which has its base electrode connected to the collector electrode of the transistor 22, to conduct and energize a second stator-phase winding 34 of the motor 13. In addition, conduction of the transistor 22 causes the transistor 25 to become non-conductive, the long-tailed circuit arrangement of the transistors 22 to 25 being such that only one of them can be conductive at a time. The transistor 31 becomes non-conductive, and therefore ceases to provide energization of the first stator-phase winding 32, when the transistor 25 becomes non-conductive. Thus, when during each cycle the potential at the emitter electrode of the transistor 21 reaches —V volts with respect to ground, energization of the motor stator is effectively transferred from the first stator-phase winding 32 to the second winding 34.

The transistor 22 remains conductive, so that the second stator-phase winding 34 continues to be energized, throughout the second period of each cycle until the potential at the emitter electrode of the transistor 21 reaches —2V volts with respect to ground. When this potential is reached, the diode 29 becomes conductive and this causes the transistor 23 to conduct. Conduction of the transistor 23 causes an N-P-N junction transistor 35, which has its base electrode connected to the collector electrode of the transistor 23, to conduct and energize the third stator-phase winding 36 of the motor 13. In addition, conduction of the transistor 23 causes the transistor 22, in with it the transistor 33, to become non-conductive so that energization of the winding 34 ceases.

The transistor 23 remains conductive, so that the stator-phase winding 36 continues to be energized, throughout the third period of each cycle until the potential at the emitter electrode of the transistor 21 reaches —3V volts with respect to ground. When this potential is reached, the diode 30 becomes conductive and this causes the transistor 24 to conduct. Conduction of the transistor 24 renders the transistor 23, and with it the transistor 35, non-conductive, and in addition causes the transistor 31 to conduct again, the collector electrode of the transistor 31, as well as that of the transistor 25, being connected to the base electrode of the transistor 31. Energization of the motor stator is therefore transferred from the third stator-phase winding 36 back to the first winding 32.

Energization of the winding 32 is continued through the rapid flyback of the sawtooth waveform by virtue of the fact that as soon as the emitter electrode of the transistor 21 returns to ground potential the transistor 25 conducts in place of the transistor 24 without interrupting conduction of the transistor 31. The transistor 25 then continues to conduct so as to maintain energization of the first winding 32 through the first period of the next cycle, and the process described above, by which the three windings 32, 34 and 36 of the motor 13 are energized in succession during each cycle is repeated. Thus, in response to each cycle of the sawtooth waveform there is one complete rotation of the stator field, and consequently one revolution of the motor shaft 14 (FIGURE 2).

Referring now to FIGURE 4, the non-linear circuit 3 of the engine-life apparatus is basically an amplifier provided with non-linear degenerative feedback, amplification being provided by a pre-amplifier stage 40 followed by a two-transistor main-amplifier stage 41. The stage 41 supplies current to the lead 3c, and thence to the transistor 8 (FIGURE 2), via series-connected resistors 42 and 43. A non-linear network, which includes a series-connected chain of eight zener diodes (three diodes 44, two diodes 45, two diodes 46, and one diode 47) is connected in shunt with the series-connected resistors 42 and 43 to modify the degree of feedback in accordance with the output current of the stage 41. A resistor 48 is connected in series with the chains of zener diodes 44 to 47, and three resistors 49 are connected to junction points in the chain such that three, five, seven , or all eight of the zener diodes conduct according to the magnitude of the current output of the stage 41. The three diodes 44 are the first to conduct, and the two diodes 45, the two diodes 46 and, finally, the single diode 47, are brought progressively into conduction with increase in the current magnitude. The voltage signal appearing across the series-connected resistors 42 and 43 is thereby nonlinearly related to the current magnitude, and that part of this signal which appears across the resistor 43 is applied as series-degenerative feedback to the pre-amplifier stage 40 with the input signal across the leads 3a and 3b. The result is that the overall gain of the circuit 3 increases in accordance with the law of curve AB (FIGURE 1) with increase in input signal applied between the leads 3a and 3b.

In the apparatus described above with reference to FIGURE 2, only one operational parameter of the engine is used for providing the required representation. If, however, it were desired to base the representation of engine-life on, for example, engine speed as well as jet-pipe temperature, this could be done by using a signal representative of engine speed to vary the characteristic of the non-linear network. For example it might be arranged that the slope of the characteristic is varied in accordance with engine speed.

Referring now to FIGURE 5, the discharge-control circuit 11 includes a voltage comparator in the form of a long-tailed transistor stage 50 that receives the signal on the lead 11a. The stage 50 acts to trigger a monostable trigger circuit provided by a transistor 51, whenever the signal on the lead 11a reaches the relevant negative potential level with respect to ground. The pulse emitted in these circumstances by the trigger circuit is applied to the primary winding of a pulse transformer 52. The secondary of the transformer 52 is connected in series with a resistor 53 to the lead 11b and thence to the base electrode of the transistor 10 (FIGURE 2), so that the transistor 10 conducts for the duration of the emitted pulse.

The apparatus described above with reference to FIGURE 2 may include a warning-flag indicator for use in giving warning when the jet-pipe temperature exceeds a pre-set value corresponding to excessive demand imposed on the engine. This indicator may be controlled by means of a unit that includes a comparator circuit which compares the signal on the lead 3c with a signal representative of the pre-set value of jet-pipe temperature, the warning-flag being driven to a position which is out of view until the monitored temperature reaches the pre-set value.

We claim:

1. Electrical apparatus for providing a representation of engine-life as dependent upon at least one operational parameter of the engine, comprising: sensor means for supplying an electric signal that is dependent in magnitude upon the value of said one parameter; a non-linear circuit arrangement for providing an electric signal having a magnitude that is related in accordance with a predetermined non-linear law to the magnitude of the signal supplied by said sensor means, said non-linear circuit arrangement comprising an amplifier responsive to the signal supplied by said sensor means, and means coupled to the amplifier to provide non-linear degenerative feedback to the amplifier; signal generator means for providing a cyclically-recurring signal at a frequency dependent upon the magnitude of the signal provided by said non-linear circuit arrangement, said signal-generator means comprising integrator means for integrating with respect to time the signal provided by said non-linear circuit arrangement, and means for automatically terminating and then restarting the integration process performed by said integrator means whenever the integral reaches a predetermied value; and means for providing a representation of engine-life in accordance with the number of cycles of said cyclically-recurring signal.

2. Electrical apparatus according to claim 1 including means for rendering the magnitude of the signal supplied by the sensor means representative of the extent to which the value of said one parameter exceeds a predetermined value thereof.

3. Electrical apparatus according to claim 2 including means to add to the output signal of the amplifier a signal of predetermined and substantially constant magnitude, said means for providing the cyclically-recurring signal being responsive to the resultant signal to provide said cyclically-recurring signal at a frequency dependent upon the sum of the magnitudes of the output signal of the amplifier and the added signal.

4. Electrical apparatus for providing a representation of engine-life as dependent upon at least one operational parameter of the engine, comprising: first means for providing a first signal having a magnitude dependent upon the value of said one parameter; second means for providing a cyclically-recurring signal of substantially sawtooth waveform having a frequency dependent upon the magnitude of said first signal, said second means comprising integrator means for integrating with respect to time said first signal, and means for automatically terminating and restarting the integration process performed by said integrator means whenever the integral reaches a predetermined value; and third means for providing a representation of engine-life in accordance with the number of cycles of said cyclically-recurring signal provided by said second means.

5. Electrical apparatus for providing a representation of engine-life as dependent upon at least one operational parameter of the engine comprising: sensor means for supplying an electric signal that is dependent in magnitude upon the value of said one parameter; a non-linear circuit arrangement for providing an electric signal having a magnitude that is related to the magnitude of the signal supplied by said sensor means in accordance with a predetermined non-linear law; sawtooth-generator means for providing a cyclically-recurring signal of substantially sawtooth waveform having a frequency dependent upon the magnitude of the signal provided by said non-linear circuit arrangement, said sawtooth-generator means comprising integrator means for integrating with respect to time the signal provided by the non-linear circuit arrangement, and means for automatically terminating and restarting the integration process performed by said integrator means whenever the integral reaches a predetermined value; and means for providing a representation of engine-life in accordance with the number of cycles of said cyclically-recurring signal.

6. Electrical apparatus for providing a representation of engine-life dependent upon at least one operational parameter of the engine, comprising first means for providing a signal dependent upon the value of said one parameter, second means responsive to the signal provided by said first means to provide a cyclically-recurring signal at a frequency dependent upon the value of said one parameter, and third means for providing a representation of engine-life in accordance with the number of cycles of said cyclically-recurring signal provided by said second means, said third means including an electric motor having a rotatable shaft and a plurality of field windings, and circuit means for discriminating between different amplitude levels of the signal provided by said second means to energize the field windings one at a time and in turn through each cycle of the signal provided by said second means.

7. Electrical apparatus for providing a representation of engine-life of a gas-turbine engine, comprising: sensor means for supplying an electric signal that is dependent in magnitude upon the temperature of a part of the engine; a non-linear circuit arrangement for providing an electric signal having a magnitude that is related to the magnitude of the signal supplied by said sensor means in accordance with a predetermined non-linear law; sawtooth-generator means for providing a cyclically-recurring signal of substantially sawtooth waveform having a frequency dependent upon the magnitude of the signal provided by said non-linear circuit arrangement, said sawtooth-generator means comprising integrator means for integrating with respect to time the signal provided by the non-linear circuit arrangement, and means for automatically terminating and restarting the integration process performed by said integrator means whenever the integral reaches a predetermined value; and means for providing a representation of engine-life in accordance with the number of cycles of said cyclically-recurring signal.

8. Electrical apparatus for providing a representation of engine-life of a gas-turbine engine, comprising: sensor means for supplying an electric signal that is dependent in magnitude upon jet-pipe temperature of the engine; a non-linear circuit arrangement for providing an electric signal having a magnitude that is related to the magnitude of the signal supplied by said sensor means in accordance with a predetermined non-linear law; sawtooth-generator means for providing a cyclically-recurring signal of substantially sawtooth waveform having a frequency dependent upon the magnitude of the signal provided by said non-linear circuit arrangement, said sawtooth-generator means comprising integrator means for integrating with respect to time the signal provided by the non-linear circuit arrangement, and means for automatically terminating and restarting the integration process performed by said integrator means whenever the integral reaches a predetermined value; an electric motor having a plurality of stator-field windings and a rotatable shaft; circuit means responsive to said cyclically-recurring signal for discriminating between different amplitude levels of said sawtooth waveform to energize the stator-field windings in sequence; and counter means coupled to the shaft of the motor to provide a count in accordance with the number of revolutions of the shaft.

References Cited

UNITED STATES PATENTS

| | | | |
|---|---|---|---|
| 3,237,448 | 3/1966 | Howell et al. | 73—116 |
| 3,250,901 | 5/1966 | Brahm | 73—116 |
| 3,256,426 | 6/1966 | Roth et al. | 235—183 |
| 3,281,584 | 10/1966 | Martinez | 235—183 |

RICHARD C. QUEISSER, *Primary Examiner.*

J. W. MYRACLE, *Assistant Examiner.*